United States Patent [19]
Christ et al.

[11] Patent Number: 5,932,134
[45] Date of Patent: Aug. 3, 1999

[54] POLYMER-BASED COMPOSITION FOR PRODUCTING MAGNETIC AND MAGNETIZABLE MOLDED ARTICLES

[75] Inventors: Hubert Christ, Merzenich; Hans-Peter Meyerhoff, Elsdorf, both of Germany

[73] Assignee: A. Schulman GmbH, Kerpen, Germany

[21] Appl. No.: 08/750,700

[22] PCT Filed: Jun. 12, 1995

[86] PCT No.: PCT/EP95/02256

§ 371 Date: Apr. 7, 1997

§ 102(e) Date: Apr. 7, 1997

[87] PCT Pub. No.: WO95/34902

PCT Pub. Date: Dec. 21, 1995

[30] Foreign Application Priority Data

Jun. 11, 1994 [DE] Germany .............................. 44 20 318

[51] Int. Cl.$^6$ ................ H01F 1/08; H01F 1/26; H01F 1/113; H01F 1/37

[52] U.S. Cl. ...................... 252/62.54; 252/62.55; 148/104; 524/413; 264/429; 264/176.1

[58] Field of Search ................ 252/62.54, 62.55; 148/104; 524/413; 264/429, 176.1

[56] References Cited

U.S. PATENT DOCUMENTS

| | | | |
|---|---|---|---|
| 4,000,229 | 12/1976 | Wainer | 252/62.55 |
| 4,148,846 | 4/1979 | Owens et al. | 260/825 |
| 4,327,346 | 4/1982 | Tada et al. | 252/62.54 |
| 5,563,001 | 10/1996 | Gay | 148/104 |
| 5,578,670 | 11/1996 | Nakazawa et al. | 252/62.54 |

FOREIGN PATENT DOCUMENTS

| | | |
|---|---|---|
| 0 115 846 | 8/1984 | European Pat. Off. . |
| 0 115 847 | 8/1984 | European Pat. Off. . |
| 0 116 456 | 8/1984 | European Pat. Off. . |
| 0 117 664 | 9/1984 | European Pat. Off. . |
| 0 233 473 | 8/1987 | European Pat. Off. . |
| 0 235 690 | 9/1987 | European Pat. Off. . |
| 0 256 461 | 2/1988 | European Pat. Off. . |
| 271929 | 6/1988 | European Pat. Off. . |
| 0 313 862 | 5/1989 | European Pat. Off. . |
| 0 319 290 | 6/1989 | European Pat. Off. . |
| 0 320 647 | 6/1989 | European Pat. Off. . |
| 0 320 651 | 6/1989 | European Pat. Off. . |
| 0 327 384 | 8/1989 | European Pat. Off. . |
| 0 350 781 | 1/1990 | European Pat. Off. . |
| 0 484 737 | 5/1992 | European Pat. Off. . |
| 26 13 904 | 6/1977 | Germany . |
| 27 36 642 | 2/1979 | Germany . |
| 29 52 820 | 7/1980 | Germany . |
| 36 26 360 | 2/1988 | Germany . |
| 36 31 539 | 3/1988 | Germany . ...................... Germany . |

(List continued on next page.)

*Primary Examiner*—Melissa Bonner
*Attorney, Agent, or Firm*—Jones & Askew, LLP

[57] ABSTRACT

The invention is directed to a composition containing from 45 to 99 weight percent of a permanent-magnetic and/or ferromagnetic metal-containing compound and from 1 to 55 weight percent of a polymer of formula I

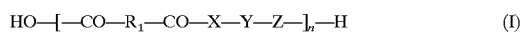

$$\text{HO}-[-\text{CO}-\text{R}_1-\text{CO}-\text{X}-\text{Y}-\text{Z}-]_n-\text{H} \qquad (I)$$

wherein $R_1$ is phenyl, naphthyl, cyclohexyl, cyclohexenyl, or a $C_1$ to $C_4$ alkyl-substituted derivative thereof, and, if $R_1$ is phenyl, the carboxy groups are in ortho, meta or para position to each other;

X, Z are O or $NR_2$, wherein $R_2$ is H or $C_1$ to $C_4$ alkyl;

Y is $(CH_2)_m$ or phenyl, cyclohexyl or cyclopentyl, and m is from 1 to 12; and n is an integer.

Furthermore, the invention is directed to a process for producing said composition, a magnetic and a non-magnetic molded article made of said composition, the production of same and the use of said composition.

14 Claims, 4 Drawing Sheets

FOREIGN PATENT DOCUMENTS

| | | |
|---|---|---|
| 36 31 540 | 3/1988 | Germany . |
| 37 04 655 | 8/1988 | |
| 37 04 657 | 8/1988 | Germany . |
| 37 25 576 | 2/1989 | Germany . |
| 38 00 603 | 7/1989 | Germany . |
| 38 28 690 | 3/1990 | Germany . |
| WO 93/08234 | 4/1993 | WIPO . |

POLYMER-BASED COMPOSITION FOR PRODUCING MAGNETIC AND MAGNETIZABLE MOLDED ARTICLES

The invention is directed to a polymer-based composition for producing magnetic and magnetizable molded articles.

The composition consists of a permanent-magnetic and/or ferromagnetic metal-containing compound and a polymer. Furthermore, the invention is directed to a process for producing said composition, the use of said composition, molded articles made of said composition, and a process for producing said molded articles, as well as to magnetic molded articles and a process for producing same.

According to prior art, anisotropic permanent magnets made of metal powders may be produced in various ways. The most widely used process for producing sintered, anisotropic permanent magnets made of powders is the pressing in a magnetic field and subsequent sintering of the pressed parts. Thus, permanent magnets of various types are produced, wherein the magnetic orientation is preferably arranged in the pressing direction or across the pressing direction. However, such a process for pressing metal powders for permanent magnets having a radial preferred orientation can be applied only within limits for magnets having a low height-diameter ratio, and magnets thus prepared possess only weak magnetic properties. Using this process, pole-oriented ring magnets are produced as well. Here, however, the process is disadvantageous due to loading problems, the weak orientation, and the occurrence of cracks in the sintered parts.

Another familiar process for producing the sintered, anisotropic magnets is the continuous drawing process. This process produces a radial anisotropy wherein the resulting energy density is, however, only slightly higher than in isotropic magnets.

In addition to these processes based on the use of metal powders, other processes are known wherein the metal powders are bound to polymers by means of binders. Thus, for the production of anisotropic permanent magnets from metal powder, a bonding between the powder and a polymer is generated initially, and the mass thus prepared is further processed by pressing, injecting, calendering or extruding, and establishing the preferred orientation using mechanical or magnetic methods.

As a rule, these anisotropic, plastic-bound permanent magnets exhibit better properties than the isotropic permanent magnets made of the same magnetic material and, in addition, may have various preferred orientations, such as axial, diametrical, radial, and multipole. However, due to the embedding in polymers, the energy density is limited, and the high values of the appropriately sintered permanent magnets cannot be achieved.

Various compositions are known from prior art, which contain a polymer in addition to a permanent-magnetic and/or ferromagnetic, metal-containing compound. In particular, these compositions are used in the production of plastic-bound permanent magnets or induction magnets.

DE-A-2,952,820 describes matrix-bound permanent magnets having highly oriented magnetic particles, as well as the production of same. A hot-melt polyamide resin is used as non-magnetic binder. The granulated mixture of ferrite and polyamide is placed in an injection molding machine and exposed to a magnetic field during injection. The drawback in this process is that the magnets thus produced have a relatively high shrinkage and poor dimensional stability which results from the absorption of water by the polyamide. In most cases, complicated tools for producing injection moldings can be produced from this material only by expensive subsequent processing.

DE-A-2,736,642 likewise reports plastic-bound permanent magnets and a process for their production. Here, polystyrene is used as the plastic, with benzene being used as a solvent. The powdered, permanent-magnetic metal and polystyrene which has been dissolved in benzene, are mixed and premagnetized in a magnetic field. After evaporation of the solvent and grinding, an injectable granulate is obtained which is subjected to final magnetization after injection molding. This process suffers from the drawback that the polymer matrix is dissolved in a solvent which must be removed in a further processing step and, in addition, is extremely toxic.

DE-A-3,626,360 describes a process for producing two- and multipole permanent magnets having high magnetic energy density. Here, a permanent-magnetic powder is mixed with polymers such as polyamide, polyurethane, polypropylene, polyethylene, or polystyrene at a weight ratio of from 1:1 to 20:1 and granulated. In a magnetic field the granulate thus formed is thermoplastically injection-molded in the desired shape, with the preferred orientations desired in the final state being established. Subsequently, the thus injection-molded parts are sintered and optionally further processed mechanically. Then, the sintered magnets are magnetized, with regard to the established poles.

EP-A-0,350,781 describes a powdered magnetic material and a magnet produced from same. Here, a crystalline, thermoplastic resin having high thermal stability is coated onto a magnetic powder. Preferably, polyether ether ketone, polyether ketone, polyphenylene sulfide, or polysulfide ketone is used as the thermoplastic resin. The coated, magnetic powders are produced using extremely polluting, high-boiling solvents, and the solvents must be extracted with heating in a subsequent step. The magnets produced according to this process have the drawback of being slightly brittle and of tending to break unless the magnetic powders used have been pretreated.

DE-A-2,613,904 describes a process for producing permanent magnets from epoxide resin and unsaturated polyester resin. The drawback of this process is that, in order to avoid corrosion, the magnets thus produced must be provided with protective layers of nickel or cadmium to prevent diffusion of oxygen through the polymer layer.

Indeed, numerous compositions and production processes for plastic-bound permanent magnets are known from prior art. However, the compositions and permanent magnets produced therefrom suffer from the drawback of lacking dimensional stability and making additional processing steps necessary to achieve useful material properties. Thus, for example, in order to improve dimensional stability of prior art magnets, a sintering process is added after forming the magnets, which then results in additional dimensional stability. Furthermore, some processes use solvents which, on the one hand, are toxic and, on the other hand, must be removed in an expensive fashion.

Therefore, the invention is based upon the technical problem of providing a composition of a permanent-magnetic and/or ferromagnetic metal-containing compound and a polymer, which, in the production of anisotropic permanent magnets and induction magnets, leads to products having temperature stability and dimensional stability. Furthermore, when processing the composition of the invention, the processing step of sintering hitherto necessary is to be omitted and operation effected without employing solvents. Thereby, the intention is to make the production of permanent magnets and induction magnets substantially more economical than is possible at present according to prior art processes using the compositions described therein.

The technical problem of the invention is solved by a composition containing from 45 to 99 weight percent of a permanent-magnetic and/or ferromagnetic metal-containing compound, from 1 to 55 weight percent of a polymer of formula I HO—[—CO—R$_1$—CO—X—Y—Z—]$_n$—H  (I)

wherein R$_1$ is phenyl, naphthyl, cyclohexyl, cyclohexenyl, or a C$_1$ to C$_4$ alkyl-substituted derivative thereof, and, if R$_1$ is phenyl, the carboxy groups are in ortho, meta or para position to each other;

X, Z are O or NR$_2$, wherein R$_2$ is H or C$_1$ to C$_4$ alkyl;

Y is (CH$_2$)$_m$ or phenyl, cyclohexyl or cyclopentyl, and m is from 1 to 12;

n is an integer, preferably from 10 to 1,000.

In a preferred embodiment, the composition consists of from 74 to 99 weight percent metal-containing compound and from 1 to 26 weight percent polymer.

Preferably, polymers selected from the group of poly (C$_1$–C$_4$)alkylene terephthalate, polynaphthalic amide, polyisophthalic amide, polyterephthalic amide, polyterephthalic acid hexamethylenediamide or mixtures thereof are contained as the polymers of formula I. Particularly preferred are polyethylene terephthalate and/or polybutylene terephthalate.

These polymers may be blended with additional polymers in any optional way. To this end, polymers from the group of polyesters, polyester amides, polyphenylene ethers, phenylene ethers, polyphenylene sulfide, aromatic polyether amides, polyamides, and polylactames are used. Particularly preferred are polymers selected from the group of polydiaminobutane diadipamide, polyhexamethylene sebacamide, polyhexamethylene dodecaneamide, polyaminoundecaneamide, polylaurin lactame, polyaryl amide or mixtures thereof.

Furthermore, the modifiers described as component C in DE-A-3,828,690, pp. 4 and 5, may be used as additives. They are graft polymerizates obtained by graft polymerization of from 5 to 90 parts by weight, preferably from 10 to 70 parts by weight, more specifically from 15 to 50 parts by weight of at least one vinyl monomer mixture of methyl methacrylate and an acrylic ester of a primary or secondary monohydric aliphatic C$_2$–C$_{10}$ alcohol, such as n-butyl acrylate, onto from 10 to 95, preferably 30 to 90, more specifically from 50 to 85 parts by weight of a particulate crosslinked diene rubber.

In addition, from 0.1 to 10 parts by weight of acrylic or methacrylic ester of tertiary butanol and/or 0.1 to 30 parts by weight of a mixture of styrene or α-methylstyrene and acrylonitrile, methacrylonitrile or maleic anhydride may be grafted as graft monomers onto the rubber base.

Particularly preferred graft monomers are mixtures of methyl methacrylate and n-butyl acrylate at a ratio of from 85:15 to 98:2, as well as mixtures thereof with t-butyl acrylate and/or styrene and acrylonitrile (ratio 72:28).

Preferred diene rubbers are crosslinked homo- and/or copolymerizates of conjugated C$_4$ to C$_6$ dienes. The preferred diene is butadiene-1,3. In addition to the diene residues, the diene copolymers may contain polymerized therein up to 20 weight percent, based on the diene copolymerizate, of residues of other ethylenically unsaturated monomers such as styrene, acrylonitrile, esters of acrylic or methacrylic acid with monohydric C$_1$ to C$_4$ alcohols, such as methyl acrylate, ethyl acrylate, methyl methacrylate, and ethyl methacrylate. The preparation of the diene-rubber graft base and the graft polymerizates produced therefrom is described, e.g., in "Methoden der Organischen Chemie" Houben-Weyl), Vol. 14/1, Georg Thieme Verlag, Stuttgart 1961, pp. 383–406, and in "Ullmanns Enzyklopadie der technischen Chemie", 4th edn., Vol. 19, Verlag Chemie, Weinheim 1981, pp. 279–284.

The conventional prior art modifiers may be used as further additives for the composition according to the invention. Specifically, there may be mentioned:

The graft polymerizates B described on pp. 4 and 5 in DE-A-3,841,183. These include, for example, graft polymerizates of acrylate rubber having a glass transition temperature of below −20° C. as a graft base, and polymerizable ethylenically unsaturated monomers having a glass transition temperature in excess of 25° C. as the graft monomers, and polybutadienes, butadiene-styrene copolymerizates and acrylate rubbers grafted with styrene and/or acrylonitrile and/or (meth)acrylic acid alkyl esters.

Likewise, silicone rubbers having graft-active sites, which are described in DE-A-3,704,657, DE-A-3,704,655, DE-A-3,631,540 and DE-A-3,631,539, may be used. Similar modifiers based on silicone rubber are also described in the specifications DE-A-3,725,576; EP-A-0,235,690; DE-A-3,800,603 and EPA-0,319,290 state of the art.

EP-A-0,233,473 describes elastomeric components such as acrylic acid derivatives with monomers containing epoxy groups as a graft additive. The EP-A-0,319,581 describes modifiers of ethylene copolymer with α,β-unsaturated carboxylic acid alkyl esters and maleic anhydride. EP-A-0,256,461, pp. 5 and 6, describes a number of ethylene-propylene rubbers (EPM rubber) and ethylene-propylene-diene rubbers (EPDM rubber) as well as their combination potential with other modifiers. The rubbers have a ratio of ethylene/propylene units of 20:80, preferably 65:35. Polymers of similar constitution are also described as impact modifiers in EP-A-0,320,651 and EP-A-0,320,647. Likewise, EP-A-0,484,737 describes polyoxymethylene polymerizates stabilized by terminal groups, EPM and EPDM rubbers, which have been grafted with acrylic acid derivatives, epoxides, dicarboxylic acids and dicarboxylic anhydrides, polymerizates of styrene derivatives, acrylic acid derivatives, acrylonitrile and polyenes. U.S. Pat. No. 4,148,846 describes graft-crosslinked monomers suitable for this purpose.

EP-A-0,313,862 reports the use of ethylene-vinyl alcohol in combination with grafted, hydrogenated styreneethylene-butylene block copolymer modified with an unsaturated dicarboxylic acid or an unsaturated dicarboxylic anhydride. EP-A-0,389,055 describes the use of epoxy and oxazoline groups-containing aromatic vinyl-diene-vinyl-cyanide copolymers or aromatic polyesters as copolymers.

Similarly, polyurethanes may be used as modifiers, as is mentioned in EP-A-0,115,846, EP-A-0,115,847, EP-A-0,116,456, EP-A-0,117,664, and EP-A-0,327,384. Such products are commercially available under the designation of Desmopan® (manufacturer: Bayer AG) and Elastolan® (manufacturer: Elastogran Polyurethane GmbH).

Furthermore, polyfluorinated derivatives of ethylene, propylene, butylene, and vinylene may be employed. Such products are commercially available under the designation of Elastosil® (manufacturer: Wacker Chemie). Likewise, modifiers including tetrafluoroethylene (PTFE), molybdenum sulfide, graphite and silanes, available under the designation of Lubrilon® (manufacturer: Com Alloy) may be used.

The WO-A 93/08234 describes the use of ethyl copolymer ionomers and copolyester urethanes which are also suitable as modifiers.

In the composition according to the invention, the modifiers may be contained in an amount of from 0 to 70 weight percent, more specifically from 0 to 40 weight percent, based on the overall polymer content.

The preparation of polybutylene terephthalate and polyethylene terephthalate is described in Kunststoffhandbuch, Vol. VIII, Polyester, by Dr. L. Goerden, Carl Hanser Verlag, Munich, 1971. Polybutylene terephthalate is prepared from dimethyl terephthalate and 1,4-butanediol; polyethylene terephthalate is prepared from dimethyl terephthalate and 1,2-ethanediol. The preparation of polyterephthalic amide is described in Kunststoffhandbuch, Vol. VI, Polyamide, by Prof. Dr. Vieweg and Dr. A. Müller, Carl Hanser Verlag, Munich, 1966. Polyterephthalic amides are prepared from terephthalic acid and $\alpha,\omega$-diamines.

Preferably, as polyterephthalic acid hexamethylenediamide, one is used which is polymerized with other polyamides such as polyamide 6 or polyamide 66. Likewise, copolyamides from dimethylterephthalic acid and trimethylhexamethylenediamine or isophthalic acid and hexamethylenediamine in combination with the above-mentioned polyterephthalic amides may be used. Similarly miscible with these polymers of formula I are polydiaminobutane diadipamide, polyhexamethylene sebacamide, polyhexamethylene dodecaneamide, polyaminoundecaneamide, polylaurinlactame, and polyarylamide from m-xylylenediamine and adipic acid. In a preferred embodiment, the composition contains from 84 to 92 weight percent permanent-magnetic and/or ferromagnetic metal-containing compound and from 8 to 16 weight percent polymer.

Preferably, permanent-magnetic metal alloys and/or ferromagnetic metal-containing compounds are employed as permanent-magnetic and/or ferromagnetic metal-containing compounds. Used as permanent-magnetic material are alloys of metals selected from the group of aluminum, nickel, cobalt, samarium, neodymium, boron, or barium ferrite or strontium ferrite or mixtures thereof. As ferromagnetic metal-containing compounds, metals selected from the group of iron, cobalt, nickel, Heusler's manganese alloys or rare earth metals or mixtures thereof are used. Examples of these compounds include ferrite powders such as $BaO \cdot 6Fe_2O_3$, $MnO-ZnO-Fe_2O_3$, $\gamma-Fe_3O_4$, $PbO \cdot 6Fe_2O_3$, $SrO \cdot 6Fe_2O_3$. Furthermore, compounds of rare earths with cobalt are employed, such as $SmCo_5$, $PrCo_5$, $NdCo_5$, $SmPrCo_5$, $SmPrNdCo_5$, $Sm_2Co_{17}$, $Pr_2Co_{17}$, $Sm_2(Co,Fe,Cu)_{17}$, and $Sm_2(Co,Fe,Cu,M)_{17}$ wherein M is Ti, Zr or Hf. Likewise, alloys of rare earths with iron and boron, such as $Nd_2Fe_{14}B$, $Nd_2Fe_{12}CO_2B$, $Pr_2Fe_{14}B$ may be used. In addition, Fe—Cr—Co magnetic powders, Mn—Al—C magnetic powders, Pt—Co magnetic powders, and Pt—Fe magnetic powders are employed.

The composition according to the invention is prepared by mixing the components, namely, the metal-containing compound and the polymer of formula I and optionally, further additives, with subsequent granulating of the mixture. The composition of the invention permits the production of one- or multipart molded articles of any shape in a single processing step, which, subsequent to magnetization, may be used as permanent magnets or as induction magnets as well. Here, the magnetic strength can be controlled as a function of the concentration of metal-containing compound in the polymer.

Using the multichannel injection molding technique, it is possible to injection coat the composition of the invention with conventional polymers in a single spraying operation. In this fashion, molded articles may be produced which, in part, consist of magnetizable regions and, in part, of non-magnetizable regions.

A molded article produced from the composition according to the invention possesses all of the advantageous properties of the plastic used, such as high impact strength, good corrosion resistance, lower weight, and higher durability. In addition, the familiar properties of a metallic magnet are present. Thus, magnets having thermoplastic properties may be prepared from the compositions according to the invention, which, owing to the simple and low-cost mode of production, are far superior to hitherto conventional magnets.

Another advantage of the compositions according to the invention is that the composition and the molded articles produced therefrom are capable of conducting electricity and heat, and therefore, may be used as substitutes for metallic conductors.

Thus, the compositions of the invention may be used as contact studs for lampholders, wherein the lampholders are produced using the two-component process. Another potential application is the use as a thermoelement in the form of a self-regulating heating conductor, as a material for the electrical shielding of electromagnetic radiation (electrosmog), and for preventing static charge.

Further possible applications based on the thermal conductivity of the composition of the invention are the use as self-regulating heating conductors for defrosting antennas, windshield washers, door handles, door locks and sliding roof frames, and for preventing misting of outside and inside mirrors. Mirrors produced on the basis of the composition according to the invention may be electroplated, do not require a mirrored glass surface, and are self-regulating heating conductors.

Furthermore, the material may also be used for thermal heat conduction in the field of sensor technology.

Therefore, an additional object of the patent is a molded article consisting of the composition according to the invention and to a process for producing said molded article.

A molded article made of this composition is produced by mixing and granulating the metal-containing compound and the polymer, and subsequent injection molding of the injectable granulate in an injection molding machine at temperatures of from 180 to 350° C. As plasticators, single- or double-shafted screw extruders, a kneader (manufacturer: Buss), Farrel Continuous Mixers or others, Brabender mills such as Banbury mills or others, or Henschel mixers, ball mills and ribbon blenders may be used.

These molded articles may be used to produce magnetic molded articles by subsequent magnetization in a magnetic field.

Thus, the composition can preferably be used for permanent magnets and induction magnets. When producing induction magnets, the injection molded article is provided with an induction coil subsequent to cooling.

Surprisingly, it has been determined that the thus injection-molded articles are dimensionally stable so that the heretofore usual sintering procedure may be omitted. Such magnets may be used in continuous operation at up to 180° C. In addition, the use of solvents is abandoned when producing and processing the composition according to the invention.

FIGS. 1 through 5 are intended to illustrate the applications of the composition according to the invention in more detail.

BRIEF DESCRIPTION OF THE DRAWINGS

FIGS. 5A–5B show two different kinds of split-pole motors.

The field of electrotechnics implies various potential applications for the plastic-bound, magnetic molded articles produced according to the invention. Thus, for example, permanent magnets may be employed as magnetic switches in pneumatic valves, pneumatic rams or hydraulic rams. Likewise, these materials may be used as pulse switches, e.g., for shock or velocity acceleration or braking. Depending on the magnetic force, the magnets thus prepared through the mixing ratios may be employed for hitherto unknown applications.

According to the state of the art today, the permanent-magnetically adjusted, plastic-bound mixtures may be injection-molded in any part and thereby, in most cases, are capable of replacing all the molded parts and sintered magnets, even in DC motors. This injection molding technique has the advantage that in a second injection molding operation using a non-magnetic material—according to the state of the art, this may be any plastic material—the plastic-bound magnets may be injection-coated in the form of a housing (see FIG. 1).

Furthermore, the magnetic molded articles thus produced may find use in electric generators, in dynamos and in transformers.

The ferromagnetic materials produced using the composition according to the invention find application as induction magnets of any type. As examples for these, there may be mentioned the rotors in squirrel cage motors wherein the rotors with slanted bars are pre-injected as a single rotor, staggered slot rotor, double staggered slot rotor or multiple rotor and, in a second injection molding operation, the rotor cage is injection-molded using a higher-melting, non-magnetic polymer. Similarly, depending on the application, a first core injection and subsequent cage structure injection molding may be conducted (see FIG. 2).

Figure 1:
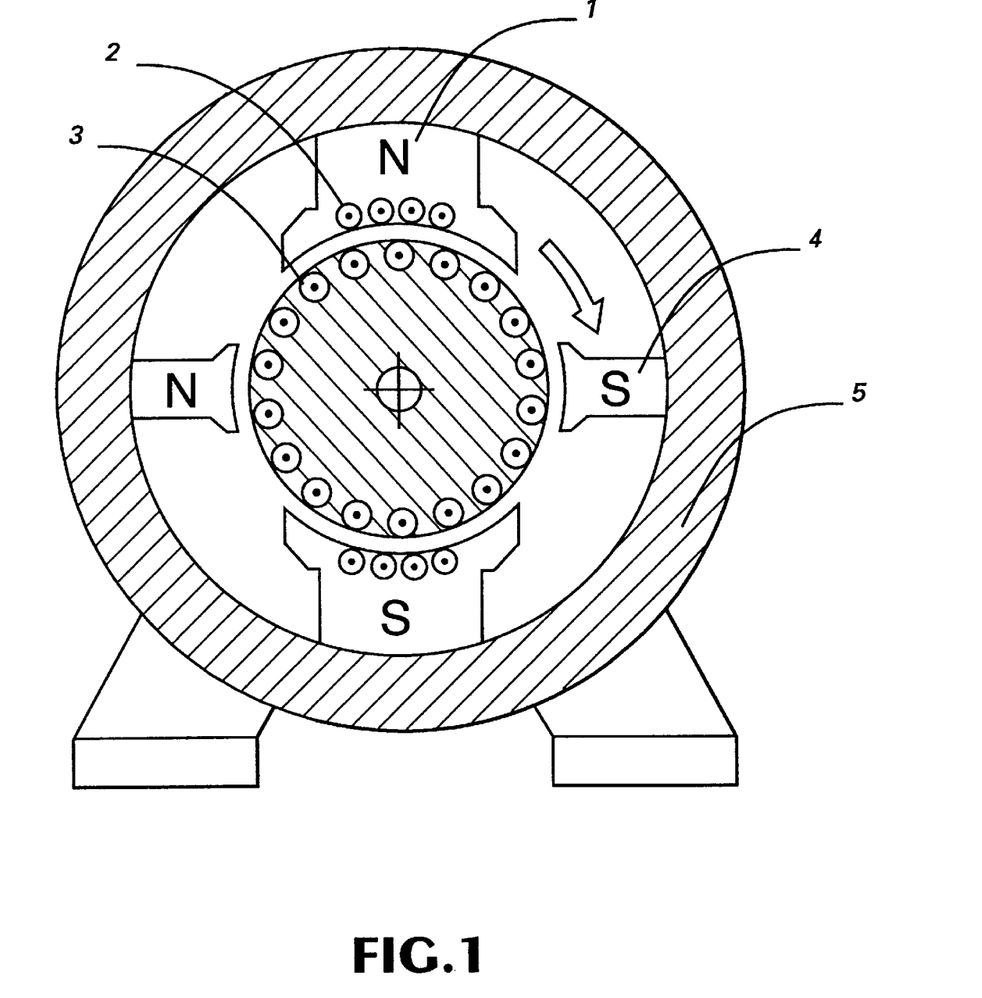
FIG. 1 shows the armature winding 3 and compensation winding 2 of a DC motor having N-poles 1 and S-poles 4 according to the present invention. The poles and windings are produced in a first injection molding operation wherein plastic-bound permanent-magnetic mixtures are introduced.
Figure 2A:
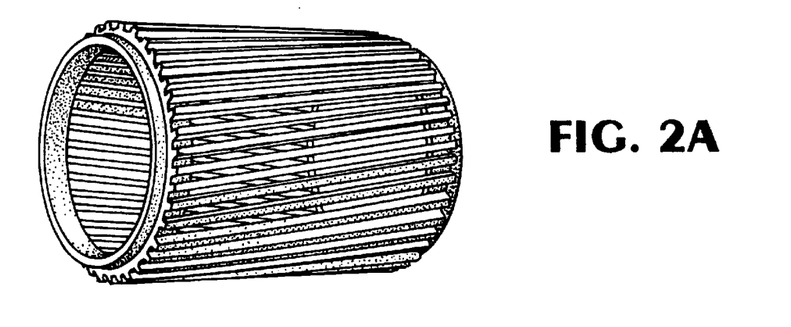
FIGS. 2A–2D shows a rotor having slanted bars (FIG. 2A), wherein this rotor is injection-coated as a single rotor (FIG. 2B), a staggered slot rotor (FIG. 2C) and a double staggered slot rotor (FIG. 2D), and in a second injection molding operation, the rotor cage is injection-molded with a higher-melting, non-magnetic polymer.
Figure 2B:
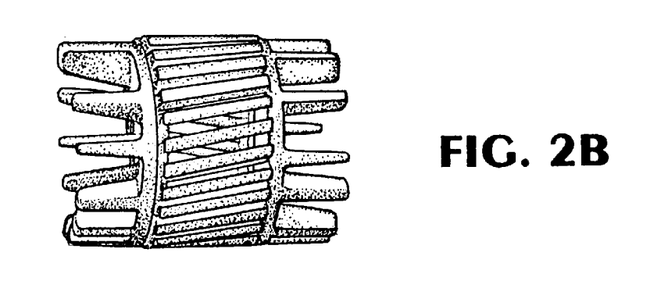
Figure 2C:
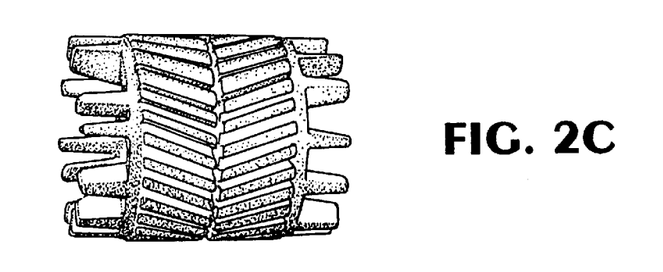
Figure 2D:
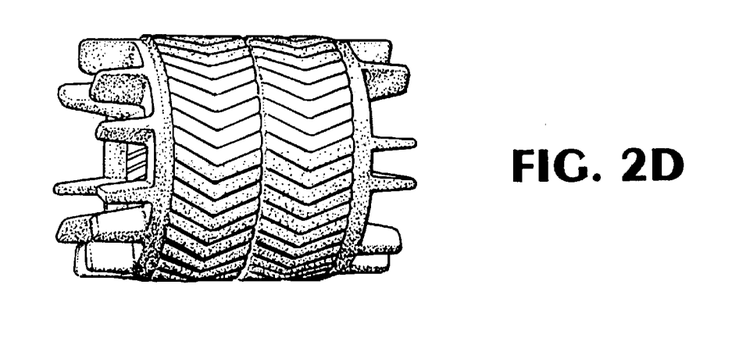
Figure 3A:
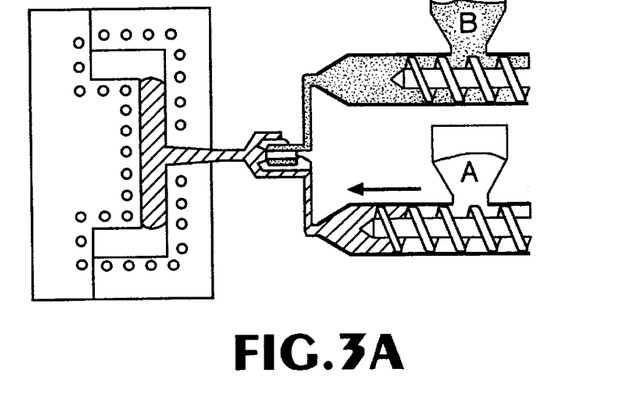
FIGS. 3A–3C illustrates the two-channel or multichannel injection molding technique. Using this process, it is possible to injection-coat ferromagnetic or permanent-magnetic, plastic-bound materials with non-magnetic materials in a single injection molding operation. Here, initially, the non-magnetizable material A is injection-molded (FIG. 3A) and, in a subsequent step, a magnetizable material B is injection-molded in addition (FIG. 3B). After completion of material A injection molding, an additional injection molding using material B is effected (FIG. 3C). Thus, material B is jacketed by material A.
Figure 3B:
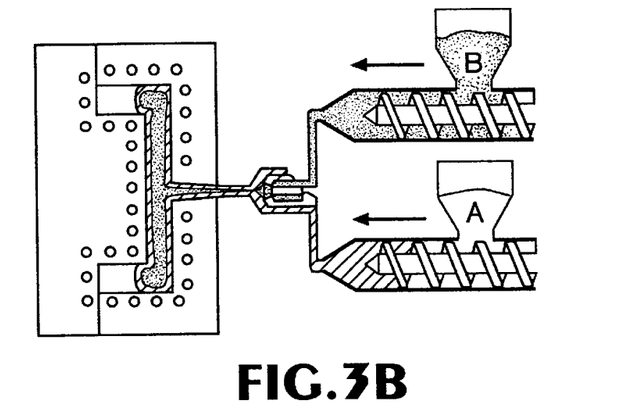
Figure 3C:
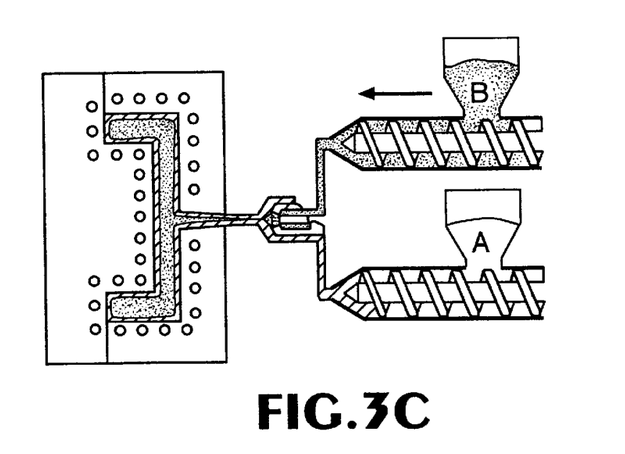

From the injection molding technique, two-channel or multichannel techniques are known, and these processes make it possible to injection-coat ferromagnetic or permanent-magnetic materials in a single injection molding operation (see FIG. 3).

Figure 4A:
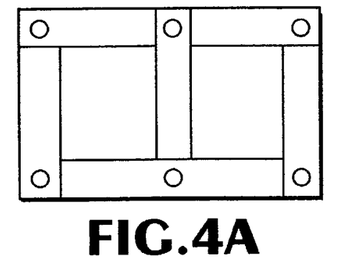
(FIGS. 4A–4B) shows a layering scheme of a three-column core transformer. Here, similarly, the transformer columns and cores may be produced using plastics provided with ferromagnetics. Number (FIG. 4B) shows the first layer of the layering scheme, and number (FIG. 4A) the second layer.
Figure 4B:
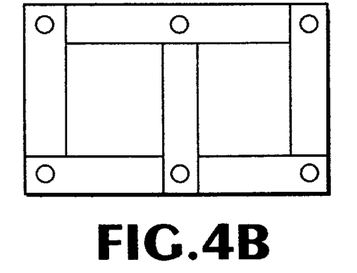

Using this technique, it is possible—as with a transformer made of iron—to produce separate, thin, multilayer transformer columns and cores using plastics provided with ferromagnetics (see FIG. 4).

Figure 5A:
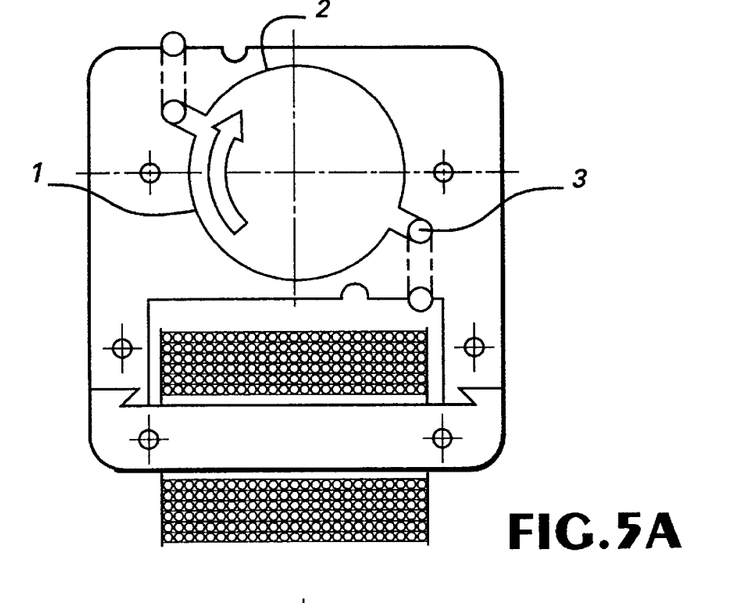
FIG. 5A shows a first split-pole motor having a main pole (1), a split pole (2), and a cage winding (3).
Figure 5B:
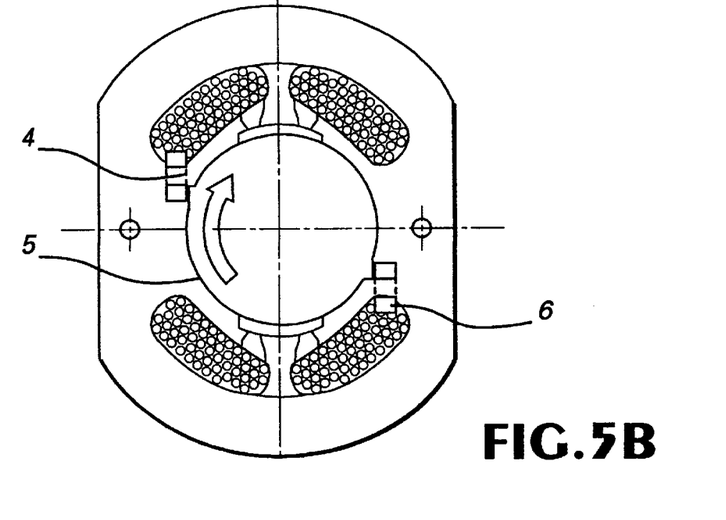
FIG. 5B shows a second split-pole motor having a switch pole (4), a main pole (5), and a cage winding (6).

In thus prepared plastics rendered ferromagnetic, the ferromagnetic particles may be oriented in a magnetic field, whereby the electrical resistance is increased perpendicular to the longitudinal direction of the magnetic field, i.e., eddy current losses may be cut down. Similarly, using this process, it is possible to cut down eddy current losses in the housing of a split-pole motor (see FIG. 5). Likewise, the polymers filled with metal powder may be employed as electrically conductive polymers.

The following examples are to illustrate the present invention in more detail, yet not restrict it.

EXAMPLES

Example 1

A mixture of 90 parts by weight of anisotropic cobalt-samarium alloy and 10 parts by weight of polybutylene terephthalate having a melt flow index (MFI at 250° C./2.16 kg) of 47.2 g per 10 minutes is mixed on a ZSK 30 (double-shaft extruder by Werner und Pfleiderer) at 300 rpm and a flow rate of 20 kg/h and subjected to extrusion granulating.

This injectable granulate is injection-molded in a molded part in an injection molding machine at a temperature of from 280 to 300° C. and subsequent to cooling, magnetized in a magnetic field, for use as a permanent magnet.

Example 2

A mixture of 6 weight percent polyethylene terephthalate, 6 weight percent polybutylene terephthalate and 88 weight percent iron powder having an average particle size of from 4 to 5 $\mu$m is mixed on a double-shaft extruder by Werner und Pfleiderer at 280 rpm and a flow rate of 20 kg/h and subjected to extrusion granulating.

In the injection molding machine, this injectable granulate is injection-molded in a molded part which may be used for induction magnets.

Example 3

12 weight percent polyterephthalic acid hexamethylene-diamide having a melting point of 236° C. is mixed with 88 weight percent of a neodymium-iron-boron alloy having an average particle size of from 6 to 8 $\mu$m in a ZSK 30 (double-shaft extruder by Werner und Pfleiderer) at 300 rpm and 18 kg/h and subjected to extrusion granulating. This injectable granulate is injection-molded in a molded part in an injection molding machine and subsequently magnetized in a magnetic field, for use as a permanent magnet.

Example 4

14 weight percent polybutylene terephthalate having a melt flow index (250° C./2.16 kg) of 47.2 g per 10 minutes, 2 weight percent methylbutadiene-styrene rubber are mixed with 84 weight percent of a neodymium-iron-boron alloy having an average particle diameter of from 8 to 10 $\mu$m in a ZSK 30 (double-shaft extruder by Werner und Pfleiderer) at 290 rpm and a flow rate of 21 kg/h and subjected to coextrusion granulating This injectable granulate is injection-molded in a molded part in an injection molding machine and subsequently magnetized in a magnetic field, for use as a permanent magnet.

Example 5

A mixture of 10 weight percent polybutylene terephthalate having a melt flow index (250° C./2.16 kg) of 47.2 g per 10 minutes, 10 weight percent polycarbonate as an additive, melt flow index (300° C./1.2 kg) of 10 g per 10 minutes, and 6 weight percent modifier Paraloid® EXL 3600 and 74 weight percent of a neodymium-iron-boron alloy having an average grain size of from 10 to 12 μm is mixed in a ZSK 30 (double-shaft extruder by Werner und Pfleiderer) at 300 rpm and a flow rate of 20 kg/h and subjected to extrusion granulating. This injectable granulate is injection-molded in a molded part in an injection molding machine and subsequently magnetized in a magnetic field, for use as a permanent magnet.

Example 6

In Example 6, the components are employed as in Example 5, mixed, however, on a kneader (manufacturer: Buss), subjected to extrusion granulating and injection-molded.

Example 7

A mixture of 90 weight percent anisotropic cobalt-samarium alloy, 8 weight percent p-phenylene sulfide and 2 weight percent polybutylene terephthalate is mixed on a kneader (manufacturer: Buss) or double-shaft extruder and subjected to extrusion granulating. This injectable granulate is injection-molded in a molded part in an injection molding machine at a temperature of from 320 to 340° C. and subsequent to cooling, magnetized in a magnetic field.

Example 8

8 weight percent polyphenylene ether, 5 weight percent polystyrene and 2 weight percent polybutylene terephthalate are mixed with 85 weight percent ferromagnetic cobalt powder having an average particle size of from 8 to 10 μm on a double-shaft extruder by Werner und Pfleiderer at 280 rpm and a flow rate of 20 kg/h and subjected to extrusion granulating. In the injection molding machine, this injectable granulate is injection-molded in a molded part which may be used for induction magnets.

Example 9

The components as in Example 7 are employed, however, extrusion-granulated and injection-molded on a single-shaft extruder (manufacturer: Bamag, Type 11.4). A molded article is obtained which, subsequent to cooling, is magnetized in a magnetic field.

We claim:

1. A composition comprising from 45–99 weight percent of a permanent-magnetic and/or ferromagnetic metal-containing compound and from 1 to 55 weight percent of a first polymer of formula I $$HO-[-COR_1-CO-X-Y-Z-]_n-H \qquad (I)$$

wherein $R_1$ is phenyl, naphthyl, cyclohexyl, cyclohexenyl, or a $C_1$ to $C_4$ alkyl-substituted derivative thereof, and, if $R_1$ is phenyl, the carboxy groups are in ortho, meta or para position to each other;

X, Z are O or $NR_2$, wherein $R_2$ is H or $C_1$ to $C_4$ alkyl;

Y is $(CH_2)_m$ or phenyl, cyclohexyl or cyclopentyl, and m is from 1 to 12; and n is an integer of from 10 to 1000, and wherein the composition further comprises a second polymer selected from the group of polyesters, polyester amides, polyphenylene ethers, polyphenylene sulfide, aromatic polyether amides, polyamides, and polylactames.

2. The composition of claim 1, wherein the first polymer is selected from the group of poly($C_1$–$C_4$)alkylene terephthalate, polynaphthalic amide, polyisophthalic amide, polyterephthalic amide, polyterephthalic acid hexamethylenediamide or mixtures thereof.

3. The composition of claim 1 wherein the first polymer is polyethylene terephthalate and/or polybutylene terephthalate.

4. The composition of claim 1, wherein either the permanent-magnetic or the ferromagnetic metal-containing compound is present.

5. The composition of claim 1, wherein the permanent-magnetic metal-containing compound and/or the ferromagnetic metal-containing compound comprises metals selected from the group of aluminum, nickel, cobalt, samarium, neodymium, boron, or barium ferrite or strontium ferrite or mixtures thereof.

6. The composition of claim 4, wherein the ferromagnetic metal is selected from the group of iron, cobalt, nickel, Heusler's manganese alloys or magnetic rare earth metal alloys or mixtures thereof.

7. The composition of claim 1 further comprising additional polymers selected from the group of polydiaminobutane diadipamide, polyhexamethylene sebacamide, polyhexamethylene dodecaneamide, polyaminoundecaneamide, polylaurinlactame, polyarylamide or mixtures thereof.

8. The composition of claim 1, containing from 74 to 99 weight percent metal-containing compound and from 1 to 26 weight percent first polymer.

9. The composition of claim 1, containing from 84 to 92 weight percent metal-containing compound and from 8 to 16 weight percent first polymer.

10. A process for producing the composition of claim 1, comprising mixing and granulating the composition.

11. A magnetic molded article comprising the composition of claim 1.

12. A process for producing the molded article of claim 11, comprising mixing and granulating the composition and injection-molding the composition at a temperature of from 180 to 350° C.

13. The process of claim 12, wherein the composition is mixed on a kneader or a similar plasticator prior to injection molding.

14. The process of claim 12, further comprising the step of permanently magnetizing the article in a magnetic field.

* * * * *